United States Patent [19]

Hale et al.

[11] Patent Number: 5,072,794
[45] Date of Patent: Dec. 17, 1991

[54] ALCOHOL-IN-OIL DRILLING FLUID SYSTEM

[75] Inventors: Arthur H. Hale; George C. Blytas, both of Houston, Tex.

[73] Assignee: Shell Oil Company, Houston, Tex.

[21] Appl. No.: 671,622

[22] Filed: Mar. 19, 1991

Related U.S. Application Data

[63] Continuation-in-part of Ser. No. 503,497, Mar. 30, 1990, abandoned, which is a continuation-in-part of Ser. No. 252,206, Sep. 30, 1988, abandoned.

[51] Int. Cl.$^5$ .................... E21B 21/00; E21B 49/00; C09K 7/02; C09K 7/06
[52] U.S. Cl. ........................................ 175/50; 175/65
[58] Field of Search .............. 175/40, 50, 65, 66; 252/8.511, 8.513, 8.515

[56] References Cited

U.S. PATENT DOCUMENTS

| | | | |
|---|---|---|---|
| 2,423,144 | 7/1947 | Gregg | 252/8.511 X |
| 2,573,960 | 11/1951 | Fischer | 252/8.515 |
| 2,697,692 | 12/1954 | Salathiel | 252/8.515 |
| 3,301,323 | 1/1967 | Parsons | 175/24 X |
| 3,639,233 | 2/1972 | Schultz et al. | 252/8.514 |
| 4,053,422 | 10/1977 | Walker | 252/48.2 X |
| 4,508,628 | 4/1985 | Walker et al. | 252/8.514 X |
| 4,780,220 | 10/1988 | Peterson | 252/8.514 |

FOREIGN PATENT DOCUMENTS

| | | |
|---|---|---|
| 324887A | 1/1988 | European Pat. Off. |
| 374671A | 12/1988 | European Pat. Off. |
| 374672A | 12/1989 | European Pat. Off. |
| 382070A | 2/1989 | European Pat. Off. |
| 382071A | 2/1989 | European Pat. Off. |
| 386638A | 3/1989 | European Pat. Off. |
| 386636A | 3/1989 | European Pat. Off. |
| 391251A | 4/1989 | European Pat. Off. |
| 391252A | 4/1989 | European Pat. Off. |
| 398112A | 5/1989 | European Pat. Off. |
| 398113A | 5/1989 | European Pat. Off. |
| 399270A1 | 5/1989 | European Pat. Off. |
| 2216573A | 10/1989 | United Kingdom |
| 2216574A | 10/1989 | United Kingdom |
| 2223255A | 4/1990 | United Kingdom |

Primary Examiner—George A. Suchfield

[57] ABSTRACT

An invert oil emulsion drilling fluid containing oil, an emulsifier such as a fatty acid soap, clay or polymer, and an alcohol such as glycerol or cyclicetherpolyol as the internal phase of the emulsion. A method using substantially water-free drilling fluid and monitoring the influx of formation water into the drilling fluid.

15 Claims, 7 Drawing Sheets

ALCOHOL-IN-OIL DRILLING FLUID SYSTEM

This is a continuation-in-part of application Ser. No. 07/503,497, filed Mar. 30, 1990, now abandoned, which is a continuation-in-part of application Ser. No. 07/252,206, filed Sept. 30, 1988, now abandoned.

BACKGROUND OF THE INVENTION

This invention relates to oil base drilling fluids. More particularly, the invention relates to invert alcohol-in-oil drilling fluids having good rheological and fluid loss properties, while alleviating many of the problems associated with maintenance of the ionic strength of the internal water phase. They have good temperature stability and the emulsion is stable under a variety of conditions (weight, temperature, presence of drill solids, formation water, etc.)

Oil-in-water emulsion drilling fluids (or muds) generally comprise water, oil, emulsifier, clays or polymers, and various treating agents which control the physical, chemical and/or rheological properties of drilling fluids in wellbores. Oil-in-water emulsion type drilling fluids have been used advantageously in the oil well drilling industry for many years. Emulsion drilling fluids possess many advantages over regular muds such as increasing drilling rates, longer bit lives, improved hole conditions, and the like. The most commonly used emulsion drilling fluids are oil-in-water types wherein oil is the dispersed phase and water the continuous phase. Inverted or water-in-oil emulsions wherein oil is the continuous phase and water is the dispersed phase also have been used to advantage.

The selection of a drilling fluid is primarily dependent upon the geological formation being drilled and the problems associated with such formation. Principal concerns in selection of a drilling fluid are temperature of drilling conditions, formation of gas hydrates, shale dispersion, wellbore stability, and drilling fluid loss and environmental requirements. The present invention provides a drilling fluid additive which overcomes these and other problems in the art as more particularly disclosed hereinafter.

DISCUSSION OF RELEVANT ART

Applicant is not aware of any art which, in his judgment as one skilled in the art of drilling fluids, would anticipate or render obvious the novel process and composition of the present invention. However, for the purpose of fully developing the background of the invention, the following discussion is provided.

U.S. Pat. No. 4,063,603 (Rayborn) relates to a drilling fluid lubricant. While the patent is principally directed to the use of plastic beads as a drilling fluid lubricant, a list of other materials under consideration as lubricating materials is provided which includes glycerines (Col. 2, line 3).

U.S. Pat. No. 4,508,628 (Walker et al) relates to oil base invert emulsion drilling fluids. In a list of temperature stabilizing additives (Col. 7, line 43) glycerine is mentioned. The presence of a salt, e.g., NaCl (Col. 4, line 64), is described.

U.S. Pat. No. 4,478,612 (Diaz et al) describes a process for drying supercritical $CO_2$ with glycerol.

U.S. Pat. No. 4,597,779 (Diaz) discloses that the formation of hydrates in $CO_2$ is prevented by adding a polyhydric alcohol hydrate inhibitor.

U.S. Pat. No. 4,456,067 (Penner) discloses a process for inhibiting the formation of gas hydrates in producing gas wells, said gas hydrate inhibitor being a hydroxy-containing compound having less than about 10 carbon atoms.

*Compositions and Properties of Oil Well Drilling Fluids* by Walter F. Rogers, Third Edition, pp. 13-531-535, describes emulsion preparation and fluid loss problems.

"Shale Hydration Mechanics" by Martin E. Chenevert, Paper Number SPE 2401, American Institute of Mining, Metallurgical, and Petroleum Engineers, Inc., Copyright 1969.

"New Technique Determines Oil-Mud Salinity Needs in Shale Drilling" by T. C. Mondshine in *Oil and Gas Journal* dated July 14, 1969.

SUMMARY OF THE INVENTION

The primary purpose of the present invention is to provide an invert oil emulsion drilling fluid, and process for the use thereof, which drilling fluid contains no water, or substantially no water, or less water than conventional oil based mud systems. The drilling fluid comprises oil, emulsifier and alcohol as the internal phase of the emulsion. The drilling fluid alleviates much of the borehole stability problem associated with interaction of the typical invert oil mud internal phase (water) with the clay matrix of the shales drilled. It will reduce shale dispersion and thus also improve wellbore stability. The system is stable at high temperatures with good rheological and fluid loss properties. The drilling fluid of this invention also allows low temperature and high pressure drilling operations. It is a good system for inhibition of gas hydrates which form at low temperatures and high pressures.

In addition, the present invention is directed to a method for drilling a well comprising rotating a drill string to cut a borehole into the earth; and circulating invert oil emulsion drilling fluid comprising oil, emulsifier and alcohol as the internal phase of the emulsion, through the drill string and through the annulus between the drill string and the wall of the borehole. Preferably, the drilling fluid contains no water, or substantially no water, or less water than conventional oil based mud systems. The method also preferably includes monitoring the influx of formation water into the drilling fluid.

Other purposes, distinctions over the art, advantages and features of the invention will be apparent to one skilled in the art upon review of the following.

DESCRIPTION OF PREFERRED EMBODIMENTS

Applicant has discovered that the use of an alcohol such as glycerol as the internal phase of an invert oil emulsion drilling fluid presents certain advantages. Removal of all water from an oil-based mud alleviates many of the borehole stability problems associated with the interaction of the water phase with the clay matrix of the shales drilled. The calcium chloride in typical oil mud formulations is added for the purpose of obtaining what is referred to in the drilling fluid industry as "balanced activity"—that is, the water activity of the oil based mud is the same as that of the shale. The removal of water from the formulation reduces this problem since alcohol-like (particularly glycerol-like) molecules do not interact with the clay matrix in such a way as to cause swelling pressures of the magnitude observed with water. In addition, the activity range is much greater using alcohol than brines. This gives the drilling engineer greater flexibility in how the mud is formulated for a given type of shale. Frequently while drilling, water is encountered in the formations. The advantage of no water in the internal phase is that the ionic character of the water taken up by the system will be identical to that of the formation. Rheological and fluid loss properties of the alcohol based mud are essentially the same as those observed with more typical oil based muds. Additives which are currently available in the industry are applicable in the new mud system of this invention.

Although the primary advantage of this invention is to have an oil based mud with no water, nothing precludes the addition of some water or the addition of a brine. If it is appropriate to increase the salt concentration, or to raise the water activity by simple dilution with water, this may be done easily without significant alterations to the mud properties. Clearly, the amount of water in the system would still be less than that used in a conventional oil based mud system.

The ability to monitor the influx of formation water taken while drilling and to determine the composition and concentrations at the rig is a unique advantage that is essentially impossible on the rig with current technology. Even with sophisticated equipment in an analytical laboratory, the presence of a salt, e.g., NaCl or $CaCl_2$, in the initial internal phase would provide a background that would make it difficult to identify those cations and anions specific to the water influx.

In most instances, the applicable amount of alcohol in the invert oil emulsion drilling fluid, optionally including water or brine, will be determined on a well-to-well basis. A concentration of alcohol in the emulsion of at least about 30, preferably at least about 50, more preferably at least about 90, or most preferably about 100 percent by weight and, optionally, of brine or water of up to about 70, preferably up to about 50, more preferably up to about 10, and most preferably about 0 percent by weight, based on the total weight of the internal phase of the drilling fluid, is suitable to achieve the objectives of the invention.

The various inorganic salts suitable for use with the invention, include but are not limited to NaCl, NaBr, KCl, $CaCl_2$ and $NaNO_3$, among which $CaCl_2$ is preferred.

Oils suitable for use with the invention include mineral oil, crude oil, diesel fuel oil, kerosene, gas oil, mixtures thereof, and the like.

The use of salts of various kinds is done primarily for the purpose of wellbore stability. As stated in articles by Chenevert and Mondshine, above cited, a basic requirement for optimal conditions to drill shale is that the water phase in the oil mud must be in osmotic balance with the shale. Thus, for a hard dry shale, typically high salt concentrations are required to prevent the swelling pressures in the wellbore from increasing due to hydration.

The advantage of using alcohols in the internal phase is that much of the concern for the ionic character of the internal phase is no longer required. If no water is present in the system, the hydration of the shales is greatly reduced. That is not to say that the alcohols do not interact with the clays of the shale. It is known that alcohols such as ethylene glycol can interact with the clay lattice and cause a separation of the clay platelets. However, as shown herein (see example 3), the amount of swelling observed is significantly less than that observed for water (typically less than 1 percent).

The emulsifiers used in this invention are the same ones typically used in water-in-oil drilling fluids. These include the various fatty acid soaps, preferably the calcium soaps, polyamides, and mixtures. These soaps are formed while mixing the water and oil phase together in conjunction with lime which is the primary source of calcium. The alcohols is possible. Such emulsifiers are listed in the following patents: U.S. Pat. Nos. 281,042; 2,876,197; 2,994,660; 299,063; 2,962,881; 2,816,073; 2,793,996; 2,588,808; and 3,244,638.

A variety of weighting agents can be used in the present invention as well as in the typical water-in-oil emulsions. These are barite, galena, ilmenite, iron oxides, siderite, calcite, and the like.

Any of the typically used suspending agents known to the industry can be used. The preferred suspending agent is an organophilic clay (organoclay). The descriptions of these agents can be found in the following references: U.S. Pat. Nos. 2,531,427; 2,966,506; 4,105,578; and 4,208,218.

In the above cited patent by Walker et al (U.S. Pat. No. 4,508,628), it is disclosed that small amounts of alcohol based materials can be incorporated into the water phase of a water-in-oil drilling fluid for the purpose of temperature stability. The present invention is drawn to using alcohols at much higher concentrations (as much as 100 percent of the internal phase). Thus, most, if not all, of the water is removed from the system, and if formation water is taken in, then it is of the same ionic composition as that of the formation water. The present invention relates to the fact that no water is the preferred state—especially in hard dry reactive shale formations. Even in soft, wet shales the addition of alcohol at relatively high concentrations (greater than those proposed by Walker et al) reduces the amount of water available.

The alcohol of the present invention is preferably any water soluble alcohol within the following groupings or mixtures thereof, although any alcohol of less than 8 hydroxyl groups and less than 16 carbon atoms is suitable. Hereinafter "poly" is used to mean two or more, "mono" is used to mean one, "cyclic" is used to mean one or more rings, "ether" is used to mean one or more ether linkages, PECP will mean either of polyetherpolycyclicpolyol, or polycyclicpolyetherpolyol.

A preferred class of alcohol components of this invention are acyclic polyols. Among acyclic polyols, preferred are those having at least 3 carbon atoms and 2 hydroxyl groups but no more than 80 carbon atoms and 60 hydroxyl groups. More preferably, the acyclic polyols of the invention have at least 9 carbon atoms and 5 hydroxyl groups but no more than 50 carbon atoms and 40 hydroxyl groups.

Another preferred class of alcohol components of this invention are monoalicylicpolyols. Among monoalicylicpolyols, preferred are those having 5 to 30 carbon atoms and 2 to 10 hydroxyl groups.

A most preferred class of alcohol components of this invention are cyclicetherpolyols. Among cyclicetherpolyols, preferred are those having at least 6 carbon atoms, at least 2 hydroxyl groups, and at least 2 ether linkages, but no more than 1800 carbon atoms, 450 hydroxyl groups, and 600 ether linkages. Even more preferred are cyclicetherpolyols having at least 15 carbon atoms, 5 ether linkages, and at least 5 hydroxyl groups, or at least 15 carbon atoms, at least 7 ether linkages, and at least 3 hydroxyl groups. Most preferred are cyclicetherpolyols having at least 18 carbon atoms, at least 6 hydroxyl groups, and at least 6 ether linkages but preferably no more than 1200 carbon atoms, 300 hydroxyl groups, and 400 ether linkages. Weight average molecular weights [defined infra] for the cyclicetherpolyols preferably range from 1,000 to 30,000 and more preferably from 5,000 to 20,000. Among the cyclicetherpolyols, monocyclicdietherdiols are preferred and polycyclicpolyetherpolyols are more preferred.

Nonlimiting examples include monomers, oligomers and telomers of polyhydric alcohols (or their precursors, or combinations thereof) such as glycerol, telomers of glycerol such as diglycerols, triglycerols, tetraglycerols, pentaglycerols, and hexaglycerols, mixtures of glycerol and telomers of glycerol such as diglycerol and triglycerols, mixtures of telomers of glycerol, 1,5,6,9-decanetetrol, 1,2,4,5-cyclohexanetetramethanol, 1,2,4,7-heptanetetrol, 1,2,3,5-heptanetetrol, 4,4-dimethyl-1,2,3-pentanetriol, 1,3,4-cycloheptanetriol, 1,2,3-pentanetriol, 1,2,4-pentanetriol, 2,3,4-pentanetriol, 1,1-cyclopentanediol, 1,2,3-cyclopentanetriol, 1,2,3-hexanetriol, 1,2,4-hexanetriol, 1,2,3,4-hexanetetrol, 1,2,4-cyclohexanetriol, 1,2,5-cyclohexanetriol, 1,2,3,4-cyclohexanetetrol, 1,2,3,5-cyclohexanetetrol, sorbitol, mannitol and copolymers of ethylene glycol and propylene glycols with the preceding alcohols.

Cyclicetherpolyols can be obtained, for example, by extraction from saline water byproduct streams arising from the manufacture of epoxy resins, e.g., by reaction of epichlorohydrin and bisphenol A as described in U.S. Pat. Nos. 4,560,812 and 4,599,178, which are incorporated hereinto by reference thereto. The bottom stream obtained from the distillation of synthetic and natural glycerine, usually referred to as footstill bottoms, is also a convenient source of polycyclicpolyetherpolyols of the type referred to herein. In addition, a direct synthesis route is described hereinafter. The following structures are nonlimiting examples of this class of polyols. In order to obtain cyclic diethers, the number of moles of water expelled must be at least equal to the number of moles glycerol (or other polyhydric, at least trihydric, polyol) used in the reaction mixture.

(A) and (B)
CIS or TRANS
2,5-bis(hydroxymethyl)
p-dioxane (C) and (D)
CIS or TRANS
2,6-bis(hydroxymethyl)
p-dioxane (E)
Glycerine Acetal of
Hydracrylaldehyde
(I)

In structures A through D, CIS and TRANS refer to the stereoisomerism of the carbon atoms marked by an asterisk. Structures A through D can also be called bis-hydroxymethyl 1,4-p-dioxanes, monocyclicdietherdiols or cyclic dimers of glycerol.

Polycyclicpolyetherpolyols may in turn be prepared by polycondensation of compounds such as (A) through (E) supra in chemical processes which are accompanied by significant expulsion of water molecules from the polymerizing compounds. The number of ether linkages equals the number of water molecules expelled. Taking (C) or (D) supra as the building unit, the lowest molecular weight structure containing two such units is Structure (II) infra, containing two terminal hydroxyl groups, and five ether linkages. Structure (II) is formed by condensation from glycerol molecules with the expulsion of five water molecules.

This structure is a di-cyclicpoly (or penta) etherdiol, and can be called di-bis-hydroxymethyl 1,4-p-dioxane.

Polycyclicpolyetherpolyols also can be formed by further condensation or polycondensation of Structure (II) with itself, or with itself and with polyhydric, at least trihydric, monomers, e.g., glycerol monomers. Dimerization of structure (II) with expulsion of one mole of water yields:

Copolycondensation of four structure (I) units with itself and with one polyhydric (at least trihydric) molecule, e.g., a glycerol molecule, can yield structure (IV) infra and its isomeric equivalents:

Analogous structures can be obtained from structures (I) (A), (I) B, and (I) E supra by polycondensation. Structures based on (E) supra will have 5-membered rings. Spectroscopic techniques cannot conveniently distinguish between the 5 or 6 membered rings.

Structure (IV) contains twelve ether linkages, three hydroxyl groups, and four six-membered cyclic diethers, and is formed by the polycondensation of nine glycerol molecules by the expulsion of twelve water molecules. The cyclic diether units and the polycondensed glycerol units, or other polyhydric (at least trihydric) units, occur randomly in the structure. Disregarding the order of occurrence, a general chemical composition formula representative of all of these structures is:

where $x \geq 1$ and $y \geq 0$.

Preparation of cyclicetherpolyols for the practice of this invention can be obtained by direct synthetic route. For example, starting with glycerol, chlorohydrin can be produced, which upon treatment with NaOH at elevated temperatures yields glycidol. This molecular structure cyclizes at still higher temperature to yield bis hydroxymethyl 1,4-p-dioxane.

γ-monochlorohydrin glycidol bis hydroxymethyl 1,4 p-dioxane
(VI)

To make the higher molecular weight components from bis hydroxymethyl-1,4-p-dioxane and its isomers (I) (A-E) supra, the cyclic dimer is heated with acid (e.g., sulfuric acid) or basic (e.g., sodium acetate) catalyst while maintaining low pressure to facilitate continuous removal of the water being expelled during the condensation process. The rate of dehydration increases with increasing temperature, but excessive temperatures should be avoided to eliminate polymerization to intractable mixtures. Also it is essential to maintain an oxygen-free atmosphere over the solution while the reaction proceeds to avoid excessive oxidation and carbonization. Temperatures in the range from 150° C. to 350° C. can be employed with pressures ranging from subatmospheric to several atmospheres. The vapor pressure of the water-free organic mixture is reduced as the average molecular weight increases by condensation. However, the formation of water increases the pressure of the reactive mixture, and allows easy removal by continuous distillation of the produced water. The extent of polycondensation can be monitored by measuring the weight of produced water. For best results the moles of water expelled should be at least equal to the starting number of polyhydric (at least trihydric) moles, e.g., glycerol moles. In a preferred composition the number of moles expelled by polycondensation should be between 20% and 70% greater than the number of the polyhydric, or at least trihydric, moles of alcohol in the reacting mixture. For example, from a starting feed of 9000 grams of glycerol, 2200 to 2900 grams of water can be removed during the polycondensation process or about 24% to 32% of the initial glycerol weight.

The monomeric units which can enter into the polycondensation reactions to yield desirable polyethercyclic polyols are alcohols containing at least three hydroxyl groups per molecule of which at least two are vicinal. Thus, glycols of any molecular weight do not meet the requirements of this most preferred embodiment. On the other hand, triols are quite suitable. Examples are butane triols, such as 1,2,4 butanetriol, pentane triols, such as 1,2,3 pentanetriol, etc. An important class of polyhydric alcohols with straight carbon chains and four or more hydroxyl groups, called sugar alcohols, can also be used in preparing additive formulations containing cyclic polyethers. Sorbitol and mannitol are two such well known polyhydric alcohols.

A monomer of the structure:

will yield several structures, one of which is illustrated by:

The R group may itself be a group containing hydroxymethyl groups, which would in turn increase the potential for intermolecular condensation by expulsion of additional moles of water, and would increase the facility with which high molecular weight cyclic ether structures are obtained.

Examples of cyclicdietherpolyols can be obtained from trihydric alcohols with more than three carbons such as the following:

1,2,3-Pentanetriol

The following monocyclicdietherdiols of pentanetriol are obtained from Structure IX in accordance with the methods described supra:

Both dimers (A) and (B) are obtained from Structure IX by reacting at carbons 1 and 2.

Both dimers (C) and (D) are obtained by reacting Structure (IX) at carbons 2 and 3.

Dimers (E) and (F) are obtained from (IX) by reacting at 1,2 and at 2,3 positions.

(X)

Further polycondensation of the cyclicetherdiols supra will yield polycyclicpolyetherpolyols with structures which depend on which hydroxyl groups are involved in the condensation reaction. This $M_w$ value represents GPC results expressed in terms of PEG numbers obtained by using two Ultrahydrogel columns, a 250 angstroms column and a 120 angstroms column connected in series using water as solvent at 30° C. For instance, reaction between Structures (X) A supra and (X) F supra will yield (XI) infra, a dicyclicpentaetherdiol of pentanetriol as follows. Obviously, a large number of possible polycondensed structures exist.

The molecular weight of a typical composition which was found to provide excellent properties in the drilling fluid of this invention upon addition to a level of 2% w, had molecular weight parameters as determined infra. Number average molecular weight $M_n$ is shown by the following:

$$M_n = \frac{\sum_i n_i M_i}{\sum_i n_i} \cong 1230$$

Two examples of polyglycerol structures which can undergo cyclization are molecules XII and XIII below:

The general formula of the cyclized polyglycerols is poorer in oxygen and hydrogen than the general composition $C_{3x} O_{2x+1} H_{6x+2}$. Cyclization of XII yields XIV, and cyclization of XIII yields XV.

(XV)

This is the average molecular weight obtained when the total weight of the sample is divided by the number of molecules in the sample. This molecular weight determines the effect of the sample on the osmotic pressure and hence, the effect of the sample on the freezing point or other colligative properties of the total mixture.

The weight average molecular weight was found to be:

$$M_w = \frac{\sum_i n_i M_i^2}{\sum_i n_i M_i} \geq 10550$$

This molecular weight, weighs molecules proportionally to their molecular weight in the averaging process; that is, the molecular weight $M_i$, is multiplied by the weight $n_i M_i$ of material of that molecular weight rather than by the number of molecules. This type of average reflects the effect of the sample on those properties which depend on the size of the individual molecules, such as effectiveness in light scattering, or ability of the molecule to penetrate into small openings. Thus, a high $M_w$ would be beneficial if penetration of the molecules into the interplanar structure of layered clays in the formulation is to be avoided. While the invention is not limited by this theory, it is believed that such a property minimizes the swelling of clay components in the wellbore, thereby improving wellbore stability.

The ratio $M_w/M_n$ is also an indication of the spread or polydispersity in the molecular weight of molecules present in the sample, and is by definition $M_w \geq M_n$. This ratio is 8.6 for the most preferred formulation, PECP.

Most preferred samples of polycyclicpolyetherpolyols with benficial effects on the properties of drilling fluids have been found to have $M_n$ values in the order of about 150 to about 2000 and $M_w$ values in the order of 1500 to 12000. The $M_n$ and $M_w$ values for POLS are 130–145 and 700–875, respectively, but POLS (see below) is superior to many other alcohols in carrying out the purposes of this invention.

Structural determination of mixtures using Mass Spectroscopy has yielded x values (see structures V and VIII supra) of 1 to 4 in portions of the sample not exceeding 14 glycerol units, thus indicating that in a significant portion of the sample $x \geq y/2$, although the invention is not limited to this theory. This procedure is limited with regard to the molecular weight of structures that it can determine, to molecules with about 50 carbon atoms.

In accordance with a highly preferred embodiment of the invention, polycyclicpolyetherpolyols having superior characteristics are produced by thermal condensation of glycerol in distillation apparatus under conditions which allow water to be removed overhead, but not substantial amounts of glycerol or its dimers or trimers. A catalyst is required, preferably an alkali metal hydroxide, more preferably sodium hydroxide, in a preferred concentration of 0.5–1.5 percent by weight of the reaction mixture, and preferably including an alkali metal acetate, more preferably sodium acetate, in like or smaller amounts.

The mixture is heated, preferably between 150 and 350 mm Hg and free water is distilled off continuously, allowing the equilibrium limited reaction to proceed further and to completion. The glycerol will then begin to rise in temperature to about 210°–230° C. at 120–180 mm Hg, at which temperature the mixture refluxes, indicating the onset of reactions which produce water by condensation of the glycerol. By maintaining the pressure at up to 180 mm Hg, the glycerol, which may volatilize along with the water, is condensed in an overhead condensor, and preferably cooled by a coolant. The glycerol and its linear and cyclic dimers which form in the course of the volatilization process, are condensed and refluxed to the reacting mixture. Gradually the procedure results in an increase in the boiling point of the mixture, brought about by the continuous removal of water of condensation and by the increase of the molecular weight of the mixture.

As the degree of polymerization increases, and the water removed from the glycerol feed increases, the pressure over the mixture is gradually decreased externally, either in a continuous, preferably gradual mode, or at selected reaction temperatures. For example, it is possible to reduce the pressure to 120 mm Hg when the mixture reaches 250° C. at a pressure of 180 mm Hg. Alternatively, it is possible to control the pressure to diminish gradually by a known mechanical means.

The preferred way to achieve extensive dehydration without undesirable crosslinking and gelation of the polycyclicpolyetherpolyols is by the addition of small amounts of glycerol, at a later stage of the reaction, for example, when the reaction medium temperature has reached 270°–280° C. at a pressure of 50–100 mm Hg, preferably 60–90 mm Hg. Upon addition of 2-6 percent by weight of glycerol, basis final weight of glycerol added, at a point after removal, for example, of 0.8 moles of water per mole of glycerol, a drop in the temperature of the reaction mixture occurs, the drop being several degrees Centigrade or Fahrenheit. The drop is caused by the lower temperature of the glycerol being added, but more importantly indicates the endothermic nature of the reaction between glycerol molecules, or between glycerol molecules and added glycerol molecules, or between added glycerol molecules with reactive sites in the polymerizing mixture. For better effectiveness, the glycerol may be presaturated with alkaline metal hydroxide, e.g., sodium hydroxide.

Upon continued input of heat from an external source, the temperature of the reacting mixture rises to the previous highest level, or to a higher level, or to a somewhat lower level than a first high temperature, depending upon the molecular weight distribution of polycyclicpolyetherpolyols in the mixture. This procedure of incremental glycerol addition can be repeated a number of times, three being a convenient number. With three additions of glycerol the experimental reaction time between onset of reaction and its completion usually takes 5-10 hours depending on the temperature and pressure of additions and the amount of glycerol added each time. As the reaction approaches 85 percent completion it is suitable to combine glycerol additions with further reductions of pressure, going down to 30 mm Hg or even lower. As the reaction approaches completion, it turns from being highly endothermic to being thermally neutral, and at a dehydration approaching and exceeding 1.2 moles of water per mole of glycerol, it can become exothermic. This is a reflection of the propensity of the mixture to undergo rapid crosslinking of the complex polycyclicpolyetherpolyol structures. In order to avoid the occurrence of such an undesirable crosslinking reaction, it is preferred to buffer the reaction by adding a small amount of glycerol, for example, 0.3–0.9 percent or up to 1.5 percent by weight total. Preferably there is added 0.5 percent by weight of glycerol at a selected time or preferably at a point where the reaction is 96 percent complete, after removal of 1.12–1.15 moles of water per mole of glycerol in the reaction medium.

It has been found that the addition of minor amounts of epoxy resins to the reaction mixture are beneficial. Preferred epoxy resins are diglycidyl ethers, triglycidyl ethers, and tetraglycidyl ethers which, in the reacting glycerol medium, result in formation of higher molecular weight polycyclicpolyetherpolyols which substantially improve properties in connection with drilling fluid performance. Polycyclicpolyetherpolyols resulting from this process are characterized by binodal molecular weight distribution, $M_w$ in excess of 50,000, said $M_w$ being determined in a three-column gel permeation chromatography, and being 0.5 to 10% w epoxy structures. The polycyclicpolyetherpolyols are further characterized by molecular structures which are no more than 20% free of associated cyclic formations.

Experimental results show that the impact of using multifunctional glycidyl ethers on the value of $M_n$ and on the performance, particularly as regards swelling of clays when the invention is used as a drilling fluid additive, is truly significant. Thus, when using 3.0% w Epon 828 (difunctional glycidyl ether) and 3.0% w Epon 1031 (tetrafunctional glycidyl ether) tradenames of Shell Oil Company, the $M_w$ values are correspondingly 78,015 and 151,000, and the swelling inhibition is the highest with Epon 1031, with good performance on fluid loss and on dispersion. The immediately preceding $M_w$ values are expressed in terms of true molecular weight in units of Daltons by using three Ultrahydrogel columns, a Linear column, a 250 angstroms column and a 120 angstroms column in series, using water as the solvent at 30° C.

The effectiveness of adding a commercially available polyol mixture (herein referred to as POLS) and polyetherpolycyclicpolyols (herein referred to as PECP) prepared by Shell Chemical Company to inhibit cuttings dispersion are hereinafter shown for different drilling fluid combinations. The POLS sample tested herein was analyzed to be 46.8% w propylene glycol with 16.6% w linear dimers, 17.5% w linear trimers, 3.8% w linear tetramers, 3.2% w linear pentamers, and 0.88% w linear hexamers of propylene glycol, with less than 0.5% w cyclics, 11% w water and 0.2 to 0.5% w Na+ and K+. A typical PECP sample tested was 0.16% w glycerol, 11.4% w p-dioxanes, 1.1% w cyclic trimers of glycerol, 4% w cyclic and dicyclic tetramers of glycerol, 2% w cyclic and dicyclic pentamers of glycerol, 2% w dicyclic and tricyclic hexamers of glycerol, 2% w dicyclic and tricyclic heptamers of glycerol, 3% w dicyclic and tricyclic octamers of glycerol, 4% w dicyclic and tricyclic nonamers of glycerol, 27% w polycyclicpolyetherpolyols having at least 30 carbon atoms and at least 2 cyclic ethers per molecule, 37.5% w water, and 0.5% NaCl. The results indicate that PECP in combination with oil and surfactant is an effective inhibitor of cuttings dispersion. Typically PECP with oil and surfactant is more effective at inhibiting cuttings dispersion than glycerol in combination with oil and surfactant.

The following examples are illustrative of the application of the process of the present invention and of the drilling fluid composition, and are not to be construed as limiting the scope thereof.

Example 1 demonstrates data in which alcohol was mixed with diesel or mineral oil with weight material to obtain different densities. The results indicate that a glycerol or PECP internal phase can be emulsified into oil based mud that is stable with temperature. The rheological and fluid loss properties are well within the requirements typically assigned to oil based drilling fluids.

Examples 2 and 3 similar experiments are shown for incorporation of 1,2 propanediol (Example 2) and PECP (Example 3) into an oil based mud. Reasonable properties in terms of rheology and fluid loss control are observed. The results clearly indicate that a viable drilling fluid system can be used with an alcohol being used as the internal phase. In Example 4 (FIG. 1), a swelling experiment was done to demonstrate the relative impact on swelling of 100% glycerol, 35% w or 25% w calcium chloride, and 100% w diesel #2 (% w based on the total weight of solution). The composition of the alcohol/diesel emulsion shown in FIG. 1 was 18.6 ml alcohol, 178 ml diesel #2, 5 ml VersaMul TM, 1 ml VersaWet TM, 2.4 gm organophilic clay. The results clearly indicate that glycerol or PECP has a reduced tendency relative to fresh water, or the $CaCl_2$ brines, to cause swelling. This has the advantage that the swelling pressures induced by introduction of the drilling fluid to the formation should be less if an alcohol is in the internal phase of the oil mud than if a brine is in the internal phase.

In Example 5 (FIG. 2), water contents of a shale are monitored as a function of the internal phase in the oil based mud. The shale used is Garza shale which is a hard dry shale obtained from 13,750 ft. in South Texas. From the data, it is evident that low calcium chloride internal phases resulted in the increase in water content. Only at the 30 percent calcium chloride concentration was the water content approximately that of the native. In fact, it was slightly less. Hot rolling the shale in an alcohol-in-oil mud resulted in slightly less water content than the native. The results indicate that, depending upon the calcium chloride concentration, significant variation in the water content of the shale can occur.

The influx of water into the formation could cause significant increase in swelling pressure and thus borehole failure. Alcohols or calcium chloride in water are freezing point depressants. They reduce the water activity, and dependent upon the osmotic character of the shale, this can be used in oil based muds to offset the influx of water from the oil based mud into the shale. In Example 6 (FIG. 3), the activity of $CaCl_2$, glycerol, and PECP solutions is shown. The results indicate that the glycerol and PECP have much wider ranges of activities that can be used in an oil based mud to adjust the osmotic character of the mud if necessary. For shales that may require an activity below 0.388, calcium chloride cannot be used. The alcohol-in-oil mud offers an increased range from 0.388 to 0.18. In addition, if higher activities are required, then a simple dilution of the alcohol with water or brine can be used. However, as shown in Example 7 (FIG. 4), the percent water at these intermediate concentrations of alcohol is less than that observed with $CaCl_2$. So even for a shale in which the optimum water activity is relatively high (0.5 to 0.9), the amount of water available for interaction with the shales is less if alcohol is used in the internal phase relative to CaCl₂. This is a unique advantage of this invention. If formation fluids are contacted while drilling, these fluids should combine with the alcohol phase to render a fluid that has a similar ionic composition as the formation. In addition, the change in activity of the internal phase should be less in the alcohol-in-oil mud than the brine-in-oil mud. Two observations are consistent with this statement: (1) the slope of the exponential curve for calcium chloride is rather sharp in the range of calcium chloride typically used (25-35 w %). A relatively small influx in water from the formation will cause a dramatic increase in activity. This can be concluded since the majority of formation brines are predominantly sodium chloride which at saturation has an activity of 0.755; (2) with glycerol or PECP the slope is more shallow and an influx of brine results in a smaller change in activity.

For hard dry shales that are reactive to water, 100 percent alcohol has an activity coefficient that is sufficiently low that this provides a unique character to the alcohol-in-oil mud system. The low water activity is such that the possibility of increased swelling pressures due to the presence of mud is greatly reduced—thus better borehole stability. The alcohol-in-water mud provides a wider range of water activities and thus greater flexibility.

Although Walker et al has indicated that alcohols can be used as temperature stabilizers, the compositions suggested by them are restricted to 0-10 lb/bbl. The compositions envisioned by the present invention as necessary require effectively up to 100 weight percent alcohol, based on the total weight of the internal phase of the drilling fluid, with a range between 20 lb/bbl and 100 lb/bbl depending upon the activity of the fluid desired and the percent alcohol. In the Walker et al patent, they are referring to compositions which are on the order of 5-11 percent by weight of alcohol based on the internal phase of the drilling fluid. In the present patent application, reference is taken to amounts which are typically greater than about 30 percent and most likely are in the 50 to 100 percent range by weight of alcohol, based on the total weight of the internal phase of the drilling fluid.

EXAMPLE 1—GLYCEROL

| EXAMPLE 1 - GLYCEROL | | | | | | | | | |
|---|---|---|---|---|---|---|---|---|---|
| | Run 1 | Run 2 | Run 3 | Run 4 | | Run 5 | Run 6 | Run 7 | Run 8 |
| Mineral Oil (ODL) (ml)[1] | — | — | — | — | — | — | — | — | — |
| Diesel (ml) | 178 | 178 | 178 | 213 | 213 | 235 | 235 | 257 | 257 | 265 | 178 | 178 | 178 |
| VersaMul TM (ml)[2] | 5.0 | 5.0 | 5.0 | 4.5 | 4.5 | 5.0 | 5.0 | 4.5 | 4.5 | 14.0 | 5.2 | 5.2 | 5.2 |
| VersaWet TM (ml)[2] | 1.0 | 1.0 | 1.0 | 1.0 | 1.0 | 1.2 | 1.2 | 1.0 | 1.0 | 3.3 | 1.2 | 1.2 | 1.2 |
| VersaTrol HT TM (gm)[2] | 3.5 | 3.5 | 3.5 | 3.0 | 3.0 | 3.4 | 3.4 | 3.0 | 3.0 | 9.6 | 3.5 | 3.5 | 3.5 |
| VersaLig TM (gm)[2] | 5.0 | 5.0 | 7.0 | 5.0 | 5.0 | 5.4 | 5.4 | 5.0 | 5.0 | 5.8 | 5.0 | 5.0 | 7.0 |
| Glycerol (ml) | 18.6 | 18.6 | 18.6 | 16.0 | 16.0 | 18.0 | 18.0 | 16.0 | 16.0 | 50.5 | 18.6 | 18.6 | 18.6 |
| Organophilic clay (gm) | 2.4 | 2.4 | 2.4 | 2.0 | 2.0 | 2.3 | 2.3 | 2.0 | 2.0 | 4.8 | 2.4 | 2.4 | 2.4 |
| Barite (gm) | 589 | 589 | 589 | 460 | 460 | 355 | 355 | 278 | 278 | — | 589 | 589 | 589 |
| Lime (gm) | 3.5 | 3.5 | 3.5 | 3.1 | 3.1 | 3.4 | 3.4 | 3.0 | 3.0 | 9.6 | 3.5 | 3.5 | 3.5 |
| Density (lb/gal) | 18.5 | 18.5 | 18.5 | 16.2 | 16.2 | 14 | 14 | 12.5 | 12.5 | 7.8 | 18.5 | 18.5 | 18.5 |
| Hot Roll Temp. (°F.) | 150 | 300 | 400 | 150 | 300 | 150 | 300 | 150 | 300 | 150 | 150 | 300 | 400 |
| Plastic Viscosities (cps) | 69 | 87 | 95 | 43 | 59 | 26 | 30 | 20 | 24 | 9 | 64 | 70 | 80 |
| Yield Point (lb/100 ft)[2] | 22 | 6 | 5 | 14 | 15 | 10 | 13 | 4 | 5 | 1 | 2 | 5 | 5 |
| 10 second (lb/100 ft)[2] | 19 | 7 | 6 | 9 | 6 | 7 | 9 | 3 | 3 | 1 | 4 | 5 | 6 |
| 10 minute (lb/100 ft)[2] | 28 | 22 | 23 | 14 | 15 | 12 | 13 | 4 | 9 | 2 | 9 | 8 | 9 |
| Density (lb/gal) | 18.5 | 18.5 | 18.5 | 16.2 | 16.2 | 14 | 14 | 12.5 | 12.5 | 7.8 | 18.5 | 18.5 | 18.5 |
| HPHT 30 min. 300° F. (ml) | 7.9 | 3.5 | 5.5 | 9.2 | 8.5 | 8.3 | 7.5 | 5.5 | 4.5 | — | 2 | 3.5 | 14.5 |

Viscosity and rheology measurements were made using a FANN 35A at 150° F.
High Pressure High Temperature (HPHT) was performed as described in API 13B "Standard Procedure for Field Testing Drilling Fluids." The HPHT values should be multiplied by two.
[1]Mineral Oil (ODC) is a product of Vista Chemical Company.
[2]VersaMul TM primary emulsifier function (oleylamide/acid), VersaLig TM filtration control (amine treated lignite), VersaWet TM wetting agent (resin/fatty acids), VersaTrol HT TM filtration control (asphalt) are all trade names for products sold by M. I. Drilling Fluids, a Halliburton-Dresser Company.

EXAMPLE 2—PECP

| | EXAMPLE 2 - PECP | | | | | | |
|---|---|---|---|---|---|---|---|
| | Run 1 | Run 2 | | Run 3 | | Run 4 | Run 5 |
| Mineral Oil (ODC) (ml)[3] | — | — | — | — | — | 178 | 178 | 178 |
| Diesel (ml) | 178 | 178 | 178 | 235 | 235 | — | — | — |
| VersaMul TM (ml)[4] | 5.2 | 5.2 | 5.2 | 5.0 | 5.0 | 5.2 | 5.2 | 5.2 |
| VersaWet TM (ml)[4] | 1.2 | 1.2 | 1.2 | 1.2 | 1.2 | 1.2 | 1.2 | 1.2 |
| VersaTrol HT TM (gm)[4] | 3.5 | 3.5 | 3.5 | 3.4 | 3.4 | 3.5 | 3.5 | 3.5 |
| VersaLig TM (gm)[4] | 5.0 | 5.0 | 7.0 | 5.0 | 5.0 | 5.0 | 5.0 | 7.0 |
| PECP (ml) | 18.6 | 18.6 | 18.6 | 17.8 | 17.8 | 18.6 | 18.6 | 18.6 |
| Organophilic clay (gm) | 2.4 | 2.4 | 2.4 | 2.3 | 2.3 | 2.4 | 2.4 | 2.4 |
| Barite (gm) | 589 | 589 | 589 | 355 | 355 | 589 | 589 | 589 |
| Lime (gm) | 3.5 | 3.5 | 3.5 | 3.4 | 3.4 | 3.5 | 3.5 | 3.5 |
| Density | 18.5 | 18.5 | 16.2 | 14 | 14 | 18.5 | 18.5 | 18.5 |
| Hot Roll Temp. (°F.) | 150 | 300 | 400 | 150 | 300 | 150 | 300 | 400 |
| Plastic Viscosities (cps) | 70 | 89 | 95 | 27 | 33 | 64 | 69 | 83 |
| Yield Point (lb/100 ft)[2] | 22 | 3 | 7 | 10 | 9 | 0 | 6 | 8 |
| 10 second (lb/100 ft)[2] | 20 | 8 | 8 | 8 | 8 | 4 | 6 | 7 |
| 10 minute (lb/100 ft)[2] | 27 | 23 | 22 | 13 | 12 | 11 | 8 | 11 |
| Density (lb/gal) | 18.5 | 18.5 | 18.5 | 14 | 14 | 18.5 | 18.5 | 18.5 |

-continued

| EXAMPLE 2 - PECP | | | | | | | | |
|---|---|---|---|---|---|---|---|---|
| | Run 1 | | Run 2 | Run 3 | | Run 4 | | Run 5 |
| HPHT 30 min. 300° F. (ml) | 9.2 | 4.8 | 6.9 | 9.1 | 7.2 | 5.3 | 4.6 | 5.1 |

Viscosity and rheology measurements were made using a FANN 35A at 150° F.
High Pressure High Temperature (HPHT) was performed as described in API 13B "Standard Procedure for Field Testing Drilling Fluids." The HPHT should be multiplied by two.
[3]Mineral Oil (ODC) is a product of Vista Chemical Company
[4]VersaMul TM primary emulsifier function (oleylamide/acid), VersaLig TM filtration control (amine treated lignite), VersaWet TM wetting agent (resin/fatty acids), VersaTrol HT TM filtration control (asphalt) are all trade names for products sold by M. I. Drilling Fluids, a Halliburton-Dresser Company.

EXAMPLE 3—1,2 PROPANEDIOL

| EXAMPLE 3 - 1,2 PROPANEDIOL | | | | |
|---|---|---|---|---|
| | Run 1 | | Run 2 | |
| Mineral Oil (ODC) (ml)[5] | — | — | — | — |
| Diesel (ml) | 178 | 178 | 235 | 235 |
| VersaMul TM (ml)[6] | 5.2 | 5.2 | 5.0 | 5.0 |
| VersaWet TM (ml)[6] | 1.2 | 1.2 | 1.2 | 1.2 |
| VersaTrol HT TM (gm)[6] | 3.5 | 3.5 | 3.4 | 3.4 |
| VersaLig TM (gm)[6] | 5.0 | 5.0 | 5.0 | 5.0 |
| 1,2 Propanediol (ml) | 18.6 | 18.6 | 17.8 | 17.8 |
| Organophilic clay (gm) | 2.4 | 2.4 | 2.3 | 2.3 |
| Barite (gm) | 594 | 594 | 355 | 355 |
| Lime (gm) | 3.5 | 3.5 | 3.4 | 3.4 |
| Density (lb/gal) | 18.1 | 18.1 | 13.8 | 13.8 |
| Hot Roll Temp. (°F.) | 150 | 300 | 150 | 300 |
| 600 RPM | 155 | 178 | 67 | 76 |
| 300 RPM | 82 | 92 | 39 | 44 |
| Plastic Viscosities (cps) | 73 | 86 | 28 | 32 |
| Yield Point (lb/100 ft)$^2$ | 9 | 6 | 11 | 12 |
| 10 second (lb/100 ft)$^2$ | 11 | 7 | 8 | 8 |
| 10 minute (lb/100 ft)$^2$ | 24 | 22 | 13 | 12 |
| Density (lb/gal) | 18.5 | 18.5 | 14 | 14 |
| HPHT 30 min. 300° F. (ml) | 11.2 | 8.8 | 8.4 | 8 |

Viscosity and rheology measurements were made using a FANN 35A at 150° F.
High Pressure High Temperature (HPHT) was performed as described in API 13B "Standard Procedure for Field Testing Drilling Fluids." The HPHT values should be multiplied by two.
[5]Mineral Oil (ODC) is a product of Vista Chemical Company
[6]VersaMul TM primary emulsifier function (oleylamide/acid), VersaLig TM filtration control (amine treated lignite), VersaWet TM wetting agent (resin/fatty acids), VersaTrol HT TM filtration control (asphalt) are all trade names for products sold by M. I. Drilling Fluids, a Halliburton-Dresser Company.

Examples 1, 2, 3

Glycerol (1), PECP (2), 1,2 Propanediol (3)

In Examples 1, 2, and 3, mixing was done using a Multimixer in which the diesel, or mineral oil, glycerol with emulsifiers, and lime was mixed for 30 minutes. To this emulsion the fluid loss reducing agents were added followed by the organophilic clay. This mixture was blended for another 30 minutes. To this mixture, the weight material, if appropriate, was added. The samples were then hot rolled at the temperature indicated for 16 hours.

Example 4

Figure 1:
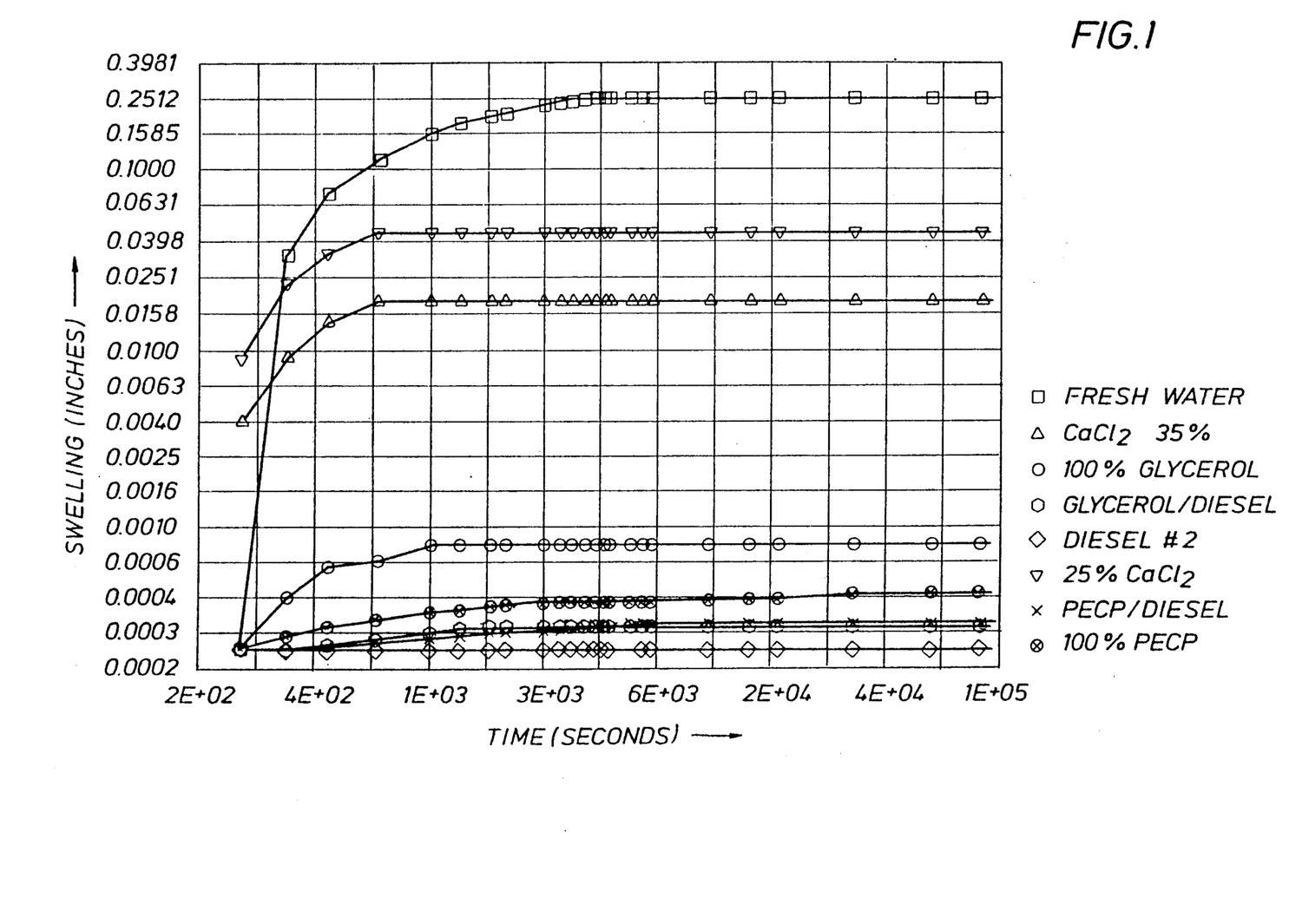
FIG. 1 illustrates swelling of Pierre shale.
Figure 1A:
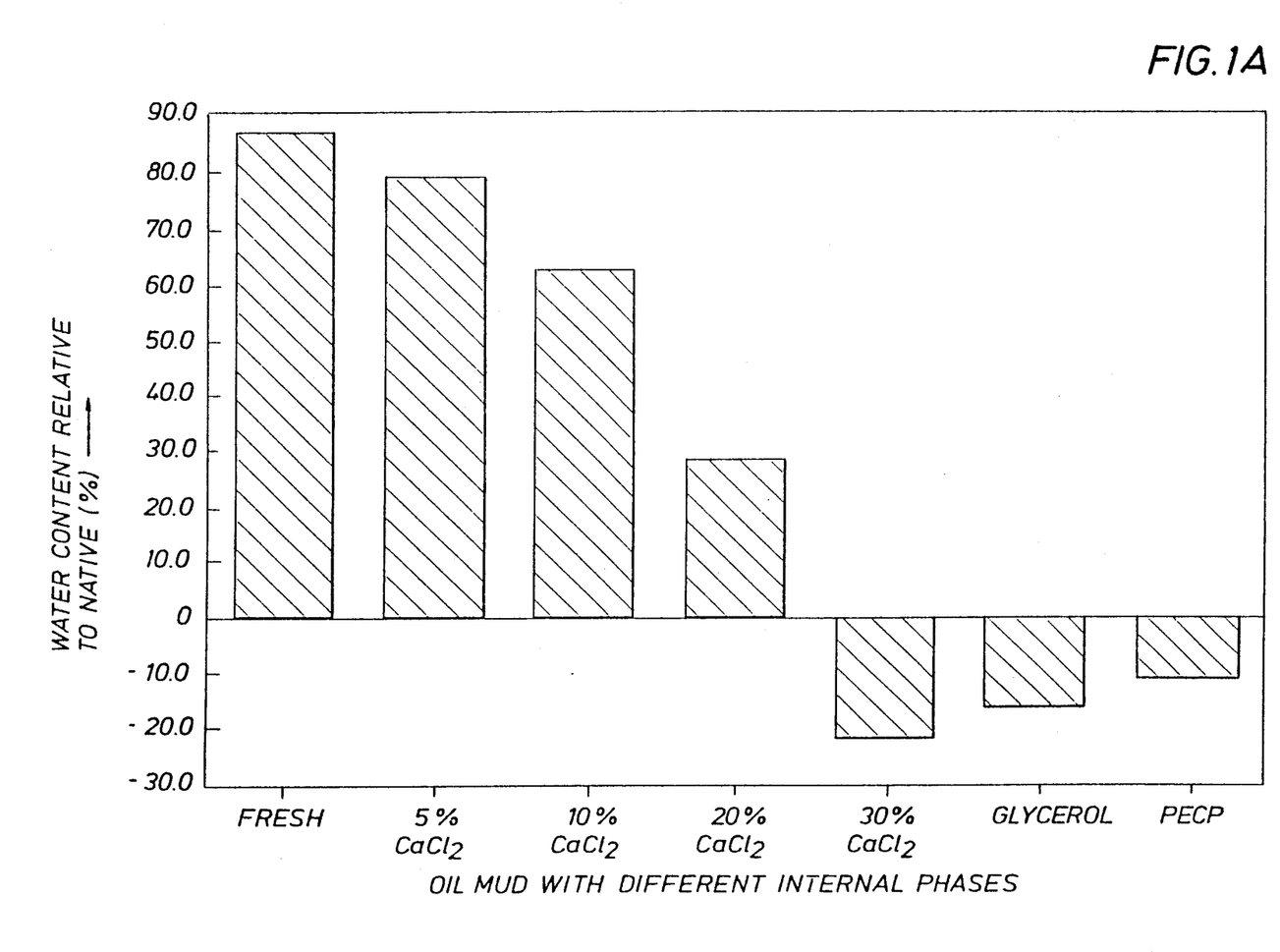
FIG. 1A illustrates water content as a function of the internal phase in oil-based mud.

FIG. 1

Swelling of Pierre Shale

In Example 4 (FIG. 1), the shale was ground to a 200 mesh size. The shale was then reconstituted at 5,000 psi for 2 hours. The reconstituted wafer was then incubated, as a function of time, with the test fluids. Swelling was monitored with the use of a linear variable transducer which was interfaced to a HP3497A Acquisition/Control Unit. Swelling is expressed in inches and time in seconds ($2E+02 = 2 \times 10^2$; $1E+5 = 1 \times 10^5$, etc.).

Example 5

Figure 2:
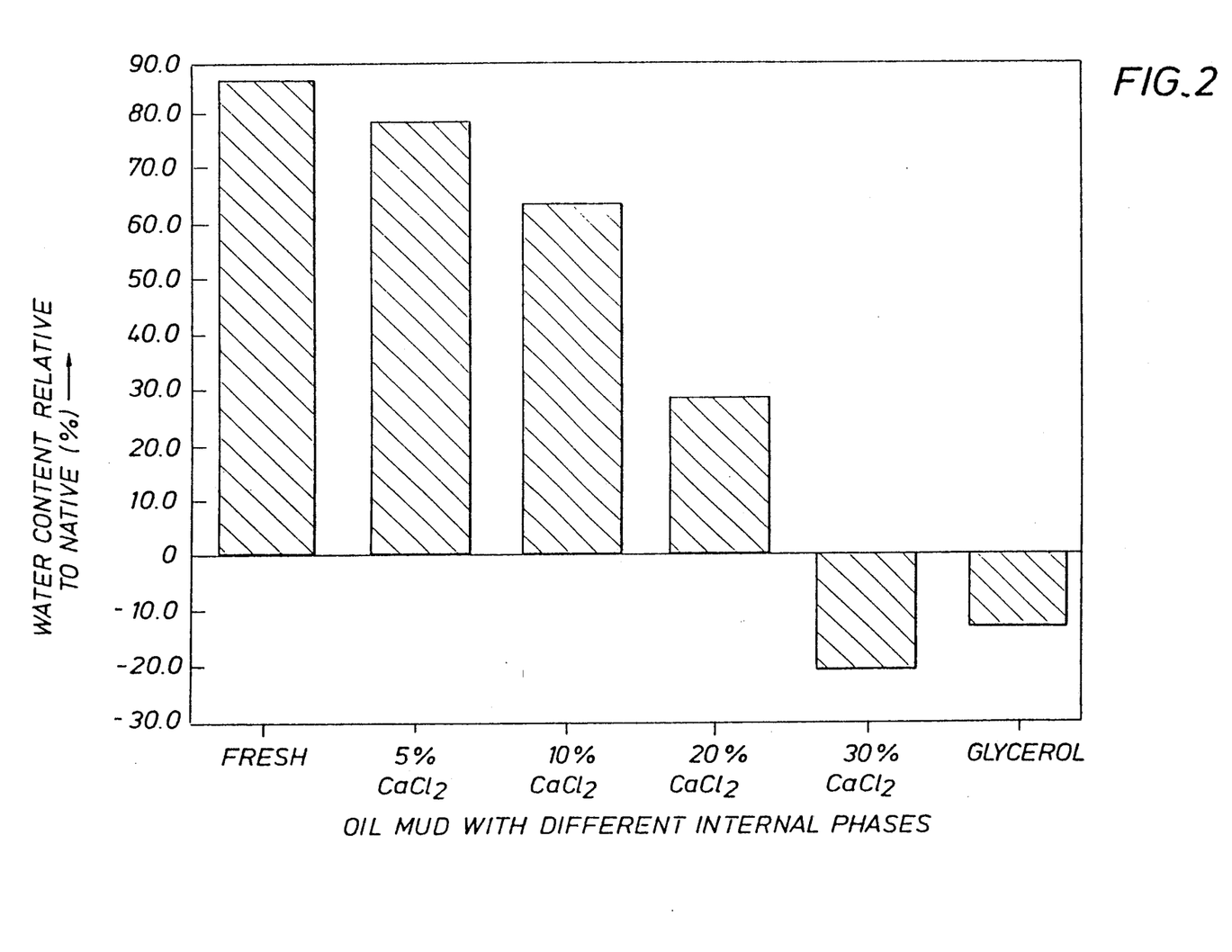
FIG. 2 shows water content as a function of the internal phase in an oil based mud.
Figure 2A:
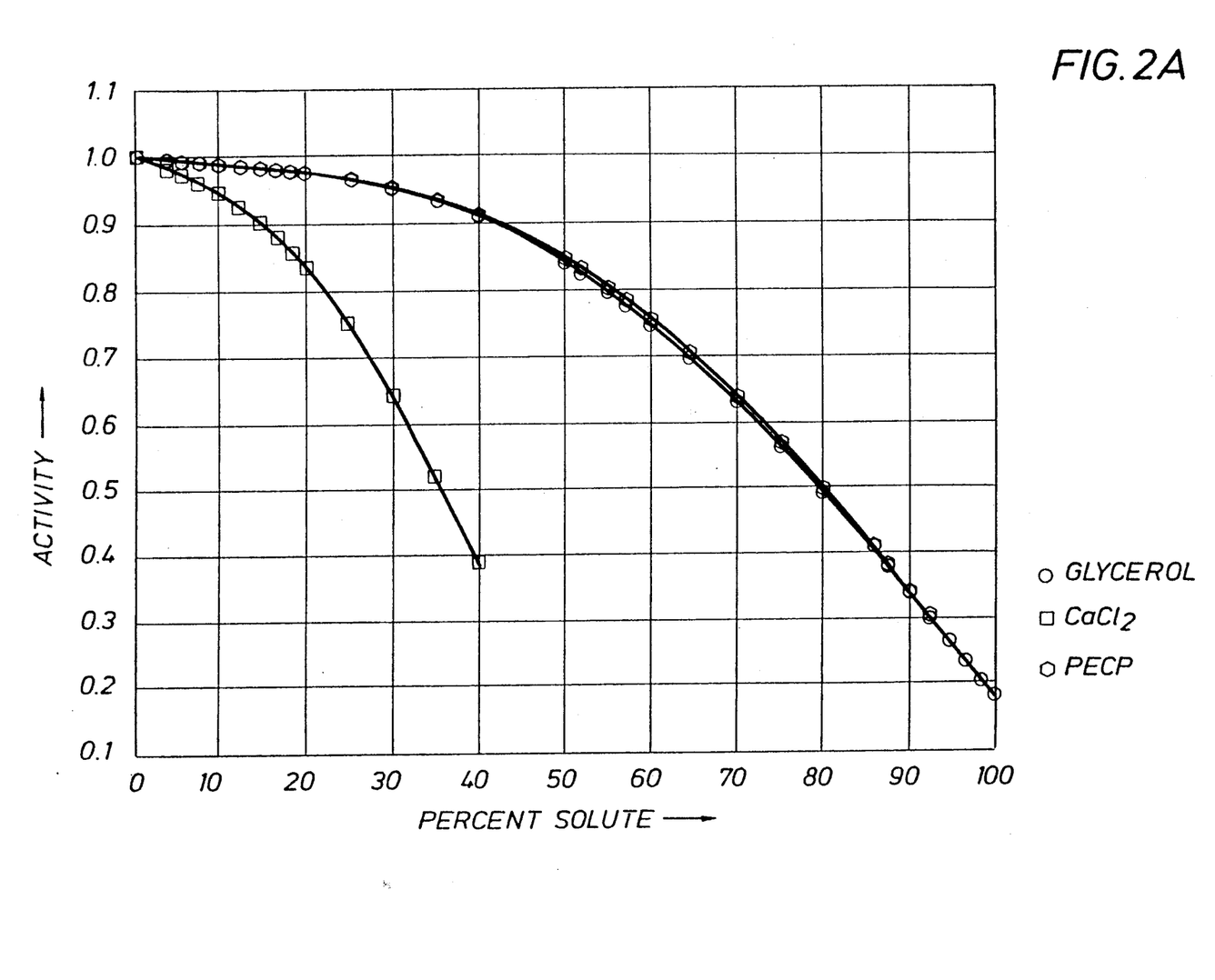
FIG. 2A illustrates the relationship of percent calcium chloride, glycerol or PECP and activity.
Figure 2B:
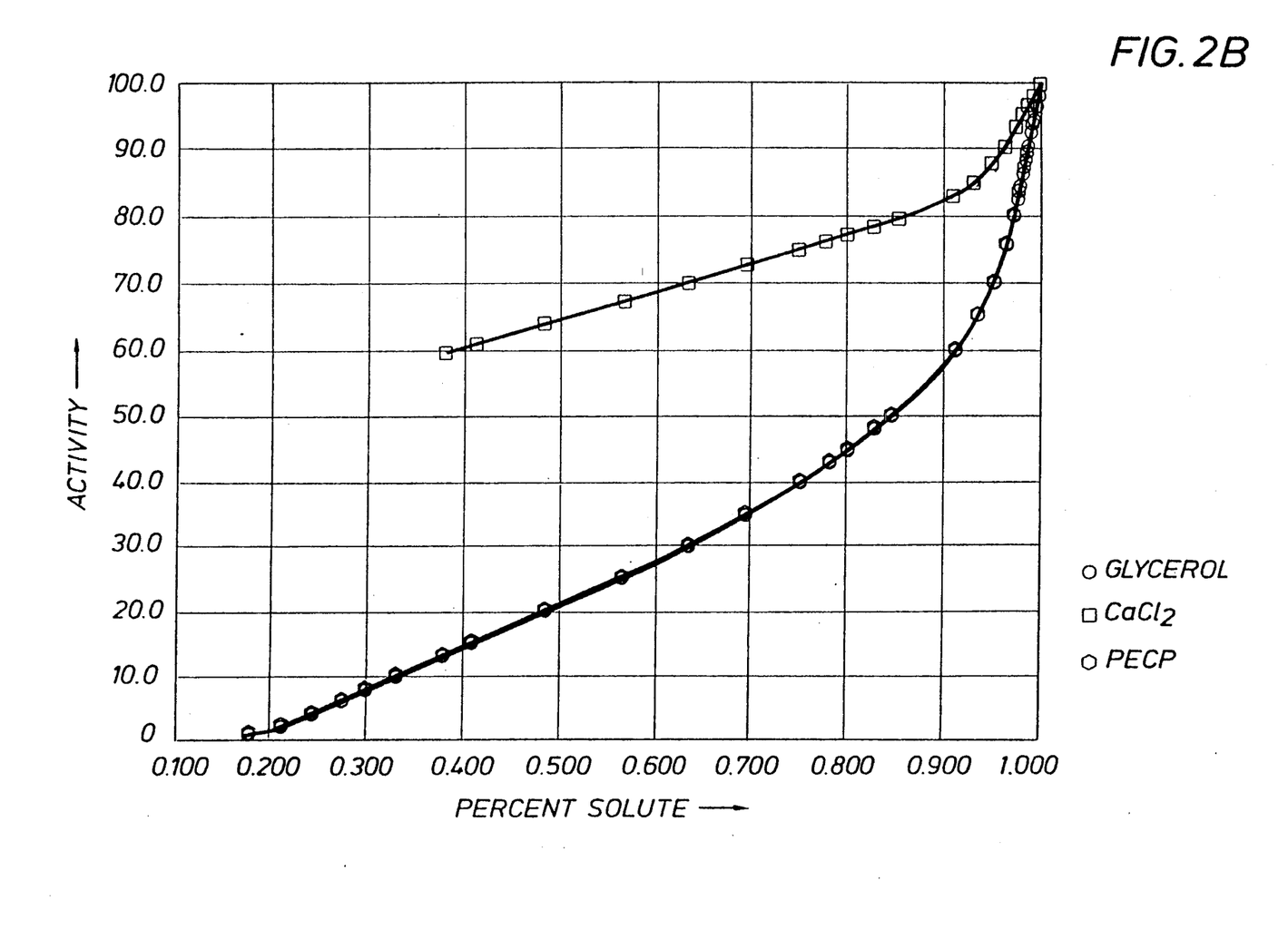
FIG. 2B illustrates the relationship of percent water and activity for glycerol, $CaCl_2$ or PECP.

FIG. 2

Water Content as a Function of the Internal Phase in an Oil Based Mud

In Example 5 (FIG. 2) a preweighed shale (Washington State) (approximately 5 gm) was incorporated into dialysis tubing. The shale wrapped in dialysis tubing was placed in different oil based muds which differed only in terms of the internal phase. The compositions of the muds are given in Table 1. The shale wrapped in dialysis tubing was hot rolled at 150° F. for one week. At the end of that week the shale was removed from the dialysis tubing, weighed again, and then dried at 105° C. for 24 hours. The dried shale was weighed and the amount of water in the shale calculated. The native shale had a water content of 2.3 percent. The data are expressed as a percent of the native.

The mud formulations for this experiment are as follows:

TABLE 1

| Compositions | 1 | 2 | 3 | 4 | 5 | 6 | 7 |
|---|---|---|---|---|---|---|---|
| CaCl$_2$% | 0.0 | 5.0 | 10.0 | 20.0 | 30.0 | 0.0 | 0.0 |
| Diesel (ml) | 203.8 | 204.2 | 204.6 | 205.6 | 206.4 | 193.6 | 193.6 |
| VersaMul TM [7] (ml) | 9.0 | 9.0 | 9.0 | 9.0 | 9.0 | 9.0 | 9.0 |
| Lime (gm) | 10.0 | 10.0 | 10.0 | 10.0 | 10.0 | 10.0 | 10.0 |
| Brine (ml) | 36.0 | 36.0 | 36.1 | 36.3 | 36.6 | 0.0 | 0.0 |
| Ken Cal L TM [8] (ml) | 2.0 | 2.0 | 2.0 | 2.0 | 2.0 | 2.0 | 2.0 |
| VersaTrol HT TM [7] (gm) | 10.0 | 10.0 | 10.0 | 10.0 | 10.0 | 10.0 | 10.0 |
| Barite (gm) | 462.9 | 461.0 | 459.0 | 454.7 | 449.9 | 446.9 | 446.9 |
| Glycerol (gm) | 0.0 | 0.0 | 0.0 | 0.0 | 0.0 | 34.1 | 0.0 |
| PECP (gm) | 0.0 | 0.0 | 0.0 | 0.0 | 0.0 | 0.0 | 34.1 |

Muds were hot rolled at 150° F. for 16 hours.
[7]VersaMul TM primary emulsifier function (oleylamide/acid) and VersaTrol HT TM filtration control (asphalt) are trade names for products sold by M. I. Drilling Fluids, a Halliburton-Dresser Company.
[8]Ken Cal L TM (mixture of emulsifiers and wetting agents) is a trade name of M. I. Drilling Fluids, a Halliburton-Dresser Company.

Example 6

Figure 3:
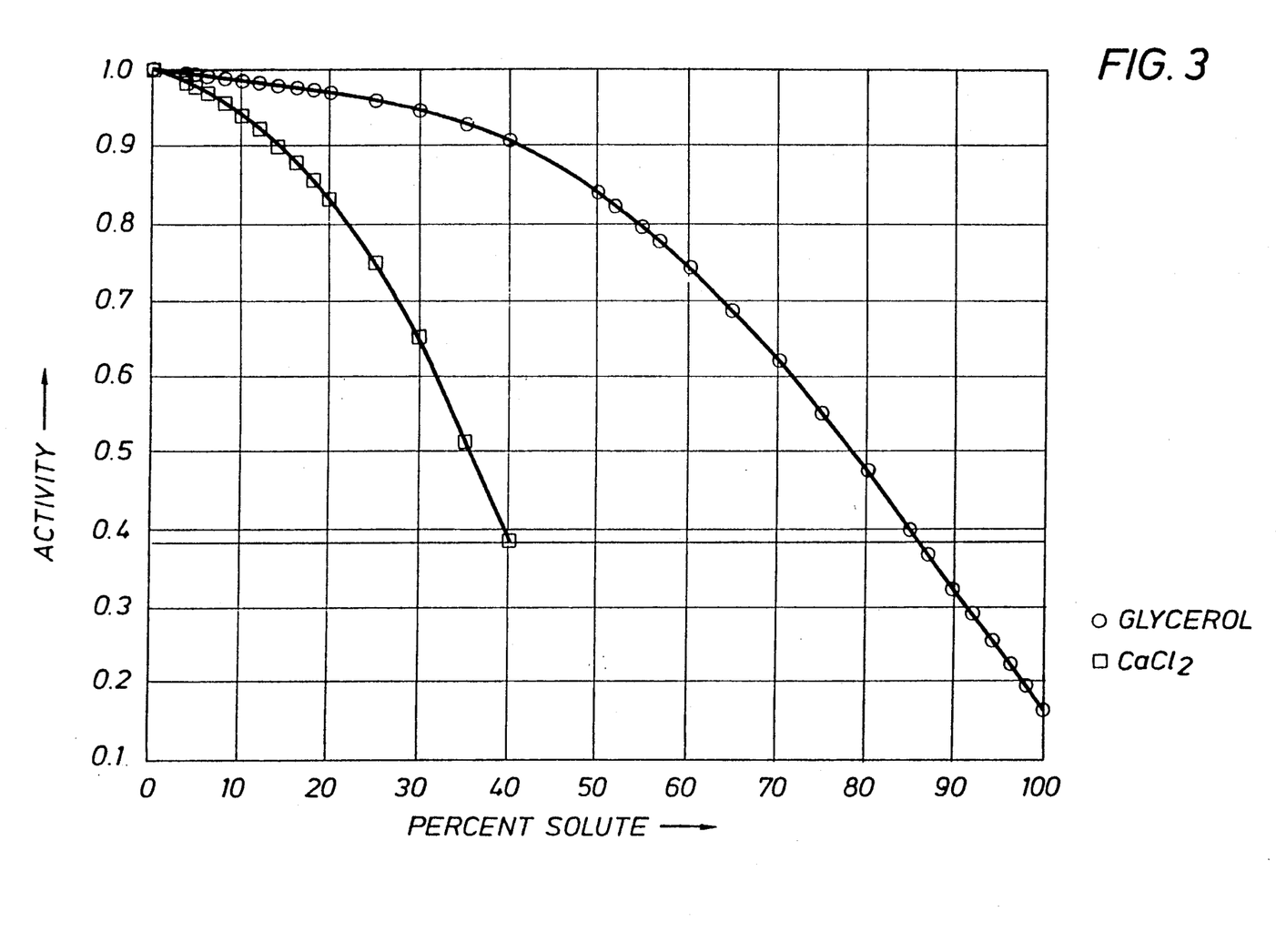
FIG. 3 depicts the relationship of percent calcium chloride or glycerol and activity.

FIG. 3

Relationship of Percent Calcium; and

Example 7

Figure 4:
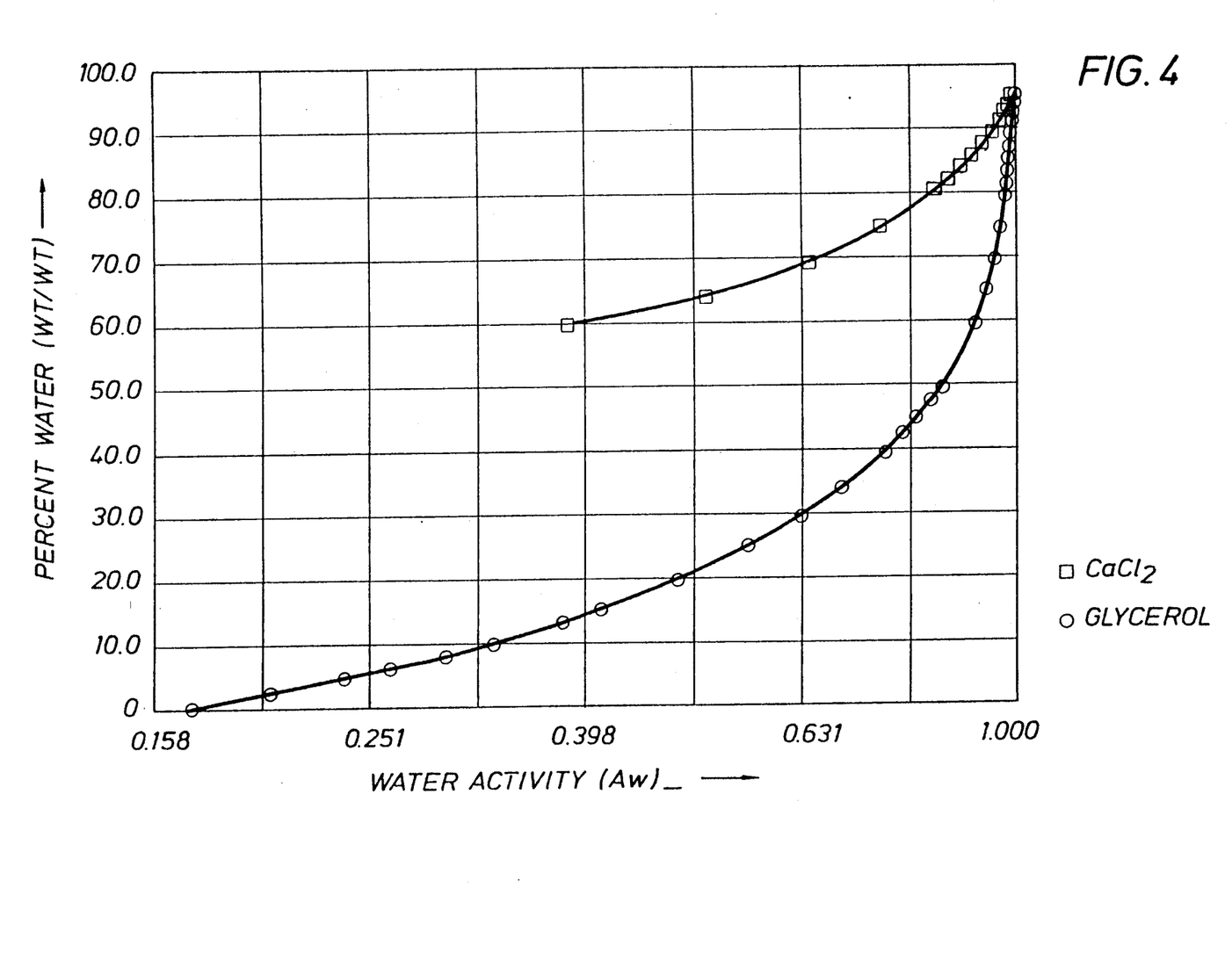
FIG. 4 shows relationships of percent water and activity for glycerol or $CaCl_2$ solution.

FIG. 4

Relationship of Percent Water

For Examples 6 and 7 (FIGS. 3 and 4) solutions of calcium chloride, glycerol, and PECP were mixed by weight with water. The activity of each solution was determined with a Digital Thermo-Hygrometer Model 880 (General Eastern).

What is claimed is:

1. A method for drilling a well comprising:
rotating a drill string to cut a borehole into the earth; and
circulating invert oil emulsion drilling fluid, said drilling fluid comprising oil, emulsifier and alcohol, through the drill string and through the annulus between the drill string and the wall of the borehole, the alcohol being at least about 30% by weight of the internal phase of the emulsion and being selected from the group consisting of (1) an alcohol having less than 8 hydroxyl groups and less than 16 carbon atoms; (2) an acyclic polyol having 3 to 80 carbon atoms and 2 to 60 hydroxyl groups; (3) a monoalicyclicpolyol having 5 to 30 carbon atoms and 2 to 10 hydroxyl groups; (4) a cyclicetherpolyol having 6 to 1800 carbon atoms, 2 to 450 hydroxyl groups, and 2 to 600 ether linkages; and (5) mixtures thereof.

2. A method for drilling a well. comprising:
rotating a drill string to cut a borehole into the earth;
circulating invert oil emulsion drilling fluid, said drilling fluid comprising oil, emulsifier and alcohol, through the drill string and through the annulus between the drill string and the wall of the borehole, the alcohol being at least about 30% by weight of the internal phase of the emulsion and being selected from the group consisting of (1) an alcohol having less than 8 hydroxyl groups and less than 16 carbon atoms; (2) an acyclic polyol having 3 to 80 carbon atoms and 2 to 60 hydroxyl groups; (3) a monoalicyclipolyol having 5 to 30 carbon atoms and 2 to 10 hydroxyl groups; (4) a cyclicetherpolyol having 6 to 1800 carbon atoms, 2 to 450 hydroxyl groups, and 2 to 600 ether linkages; and (5) mixtures thereof;
monitoring the influx of formation water into the drilling fluid; and
identifying cations and anions specific to the water influx.

3. The method of claim 1 or claim 2 wherein the alcohol is at least about 50% by weight of the internal phase of the emulsion.

4. The method of claim 1 or claim 2 wherein the alcohol is at least about 90% by weight of the internal phase of the emulsion.

5. The method of claim 1 or claim 2 wherein the alcohol is at least substantially water free.

6. The method of claim 1 or claim 2 wherein the alcohol is selected from the group consisting of (1) a polycyclicpolyetherpolyol, (2) a monocyclicdietherdiol, (3) glycerol, (4) and mixtures thereof.

7. The method of claim 1 or claim 2 wherein the alcohol is ethylene glycol.

8. The method of claim 1 or claim 2 wherein the alcohol is 1,2 propanediol.

9. The method of claim 1 or claim 2 wherein the cyclicetherpolyol is polycyclicpolyetherpolyol.

10. The method of claim 9 wherein the cyclicetherpolyol is a polycyclicpolyetherpolyol which is characterized by binodal molecular weight distribution, $M_w$ in excess of 50,000, said $M_w$ being determined in a three-column gel permeation chromatography, and being 0.5 to 10% w epoxy structures.

11. The method of claim 10 wherein the polycyclicpolyetherpolyol is further characterized by molecular structures which are no more than 20% free of associated cyclic formations.

12. The method of claim 1 or claim 2 wherein the alcohol is an alcohol having less than 8 hydroxyl groups and less than 16 carbon atoms.

13. The method of claim 1 or claim 2 wherein the alcohol is an acyclic polyol having 3 to 80 carbon atoms and 2 to 60 hydroxyl group.

14. The method of claim 1 or claim 2 wherein the alcohol is a monoalicyclicpolyol having 5 to 30 carbon atoms and 2 to 10 hydroxyl groups.

15. The method of claim 1 or claim 2 wherein the alcohol is a cyclicetherpolyol having 6 to 1000 carbon atoms, 2 to 450 hydroxyl groups, and 2 to 600 ether linkages.

* * * * *